United States Patent
Tsai et al.

(10) Patent No.: US 10,283,166 B2
(45) Date of Patent: May 7, 2019

(54) VIDEO INDEXING METHOD AND DEVICE USING THE SAME

(71) Applicant: INDUSTRIAL TECHNOLOGY RESEARCH INSTITUTE, Hsinchu (TW)

(72) Inventors: Luo-Wei Tsai, Taipei (TW); Kual-Zheng Lee, Puzi (TW); Guo-Ruei Chen, Yunlin County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 15/470,325

(22) Filed: Mar. 27, 2017

(65) Prior Publication Data
US 2018/0130498 A1    May 10, 2018

(30) Foreign Application Priority Data
Nov. 10, 2016 (TW) .............................. 105136649 A (51) Int. Cl.
*G11B 27/10* (2006.01)
*G06T 7/246* (2017.01)
(Continued)

(52) U.S. Cl.
CPC .............. *G11B 27/10* (2013.01); *G06F 16/00* (2019.01); *G06F 16/7837* (2019.01);
(Continued)

(58) Field of Classification Search
CPC ................... G11B 27/10; G06T 7/248; G06T 2207/10016; G06T 2207/30232; G06T 2207/30241
(Continued)

(56) References Cited

U.S. PATENT DOCUMENTS

| 8,102,406 B2 | 1/2012 | Peleg et al. |
| 8,311,277 B2 | 11/2012 | Peleg et al. |

(Continued)

FOREIGN PATENT DOCUMENTS

| CN | 104572792 A | 4/2015 |
| CN | 105469425 A | 4/2016 |

(Continued)

OTHER PUBLICATIONS

Chien-Li Chou et al., "Coherent Event-Based Surveillance Video Synopsis Using Trajectory Clustering", 2015 IEEE International Conference on Multimedia & Expo Workshops, Jun. 29-Jul. 3, 2015.

(Continued)

*Primary Examiner* — Thai Q Tran
*Assistant Examiner* — Nien Yang
(74) *Attorney, Agent, or Firm* — Rabin & Berdo, P.C.

(57) ABSTRACT

A video indexing method includes: analyzing trajectory information of a plurality of objects in video data and storing a plurality of pieces of object trajectory data obtained correspondingly in a storage device; determining whether the storage device satisfies a data removal condition; when the data removal condition is satisfied, performing an object trajectory analysis on the plurality of pieces of object trajectory data to select at least one target object from the objects; and extracting the object trajectory data of the at least one target object from the storage device and generating at least one video indexing image accordingly.

21 Claims, 9 Drawing Sheets (51) Int. Cl.
 *G06F 16/00* (2019.01)
 *G06F 16/783* (2019.01)
(52) U.S. Cl.
 CPC .... *G06T 7/248* (2017.01); *G06T 2207/10016* (2013.01); *G06T 2207/30232* (2013.01); *G06T 2207/30241* (2013.01)
(58) Field of Classification Search
 USPC ........................................................ 386/241
 See application file for complete search history.

(56) References Cited

U.S. PATENT DOCUMENTS

| | | | |
|---|---|---|---|
| 8,514,248 | B2 | 8/2013 | Peleg et al. |
| 8,719,687 | B2 | 5/2014 | Wu et al. |
| 8,787,730 | B2 | 7/2014 | Budzinski |
| 8,949,235 | B2 | 2/2015 | Peleg et al. |
| 9,269,245 | B2 | 2/2016 | Park et al. |
| 9,348,909 | B1 | 5/2016 | Goikhman et al. |
| 2006/0257048 | A1 | 11/2006 | Lin et al. |
| 2007/0237225 | A1 | 10/2007 | Luo et al. |
| 2010/0011297 | A1 | 1/2010 | Tsai et al. |
| 2010/0169330 | A1* | 7/2010 | Albers .............. G06F 17/30811 707/754 |
| 2012/0027371 | A1 | 2/2012 | Hackett et al. |
| 2012/0038766 | A1 | 2/2012 | Park et al. |
| 2013/0121664 | A1 | 5/2013 | Chung et al. |
| 2013/0173853 | A1* | 7/2013 | Ungureanu ........... G06F 12/124 711/103 |
| 2015/0356745 | A1 | 12/2015 | Bobbitt et al. |
| 2015/0380055 | A1* | 12/2015 | Avrahami ......... G06F 17/30817 386/241 |
| 2016/0014439 | A1 | 1/2016 | Friedrich et al. |

FOREIGN PATENT DOCUMENTS

| | | |
|---|---|---|
| TW | 200935905 A | 8/2009 |
| TW | I353787 B | 12/2011 |
| TW | I372343 B | 9/2012 |
| TW | 201328332 A | 7/2013 |
| TW | 201342935 A | 10/2013 |
| TW | I420910 B | 12/2013 |
| TW | I491390 B | 7/2015 |
| TW | 201530443 A | 8/2015 |
| TW | 201605239 A | 2/2016 |
| TW | I520095 B | 2/2016 |
| TW | I520619 B | 2/2016 |
| WO | WO-2012015563 A1 | 2/2012 |

OTHER PUBLICATIONS

Shizheng Wang et al., "A Surveillance Video Analysis and Storage Scheme for Scalable Synopsis Browsing", 2011 IEEE International Conference on Computer Vision Workshops, pp. 1947-1954, Nov. 6-13, 2011.
Rui Zhong et al., "Fast Synopsis for Moving Objects Using Compressed Video", IEEE Signal Processing Letters, vol. 21, No. 7, pp. 834-838, Jul. 2014.
Chun-Rong Huang et al., "Maximum a Posteriori Probability Estimation for Online Surveillance Video Synopsis", IEEE Transactions on Circuits and Systems for Video Technology, vol. 24, No. 8, pp. 1417-1429, Aug. 2014.
Chun-Rong Huang et al., "Online Surveillance Video Synopsis", 2012 IEEE International Symposium on Circuits and Systems, pp. 1843-1846, May 20-23, 2012.
Xiaobin Zhu et al., "Key Observation Selection for Effective Video Synopsis", 21st International Conference on Pattern Recognition, pp. 2528-2531, Nov. 11-15, 2012.
Yedid Hoshen et al., "Live Video Synopsis for Multiple Cameras", 2015 IEEE International Conference on Image Processing, pp. 212-216, Sep. 27-30, 2015.
Yael Pritch et al., "Nonchronological Video Synopsis and Indexing", IEEE Transactions on Pattern Analysis and Machine Intelligence, vol. 30, No. 11, pp. 1971-1984, Nov. 2008.
Shikun Feng et al., "Online Content-aware Video Condensation", 2012 IEEE Conference on Computer Vision and Pattern Recognition, pp. 2082-2087, Jun. 16-21, 2012.
Patrick Pérez et al., "Poisson Image Editing", ACM Transactions on Graphics, vol. 22, No. 3, pp. 313-318, 2003.
Yongwei Nie et al., "Compact Video Synopsis via Global Spatiotemporal Optimization", IEEE Transactions on Visualization and Computer Graphics, vol. 19, No. 10, pp. 1664-1676, Oct. 2013.
Taiwanese Office Action dated Mar. 9, 2016.

* cited by examiner

VIDEO INDEXING METHOD AND DEVICE USING THE SAME

This application claims the benefit of Taiwan application Serial No. 105136649, filed Nov. 10, 2016, the disclosure of which is incorporated by reference herein in its entirety.

TECHNICAL FIELD

The disclosure relates in general to a video indexing method and a device using the same, and more particularly to a video indexing method which creates video indexes according to representative object snaps and a device using the same.

BACKGROUND

Along with the increase in the density of monitoring systems, video recording has become an indispensable tool in the maintenance of law and order and is normally used after the happening of an event. However, as the density of video recorders continuously increases, it would be extremely time-consuming to manually filter a large volume of video data.

Video synopsis is a latest video indexing technology, which, through time condensation, largely reduces the redundant parts in time and space of the video data and allows the user to conveniently browse the video and intercept video data.

However, how to increase video indexing efficiency for video synopsis is still a prominent task for the industries.

SUMMARY

The disclosure is directed to a video indexing method and a device using the same capable of extracting objects from the video data and condensing the video data into one or more video indexing images according to the representative object snap of each object. Thus, the user can quickly browse the video content, and the video indexing efficiency can be increased.

According to one embodiment, a video indexing method is provided. The video indexing method includes steps of: analyzing trajectory information of a plurality of objects in video data and storing a plurality of pieces of object trajectory data obtained correspondingly in a storage device; determining whether the storage device satisfies a data removal condition; when the data removal condition is satisfied, performing an object trajectory analysis on the plurality of pieces of object trajectory data to select at least one target object from the objects, wherein at the time that the data removal condition is satisfied, the storage device stores first object trajectory data of at least one first object and second object trajectory data of at least one second object, and the object trajectory analysis includes: calculating a similarity between the second object trajectory data and average trajectory data computed from the first object trajectory data; determining whether the similarity satisfies a similarity condition; when the similarity satisfies the similarity condition, selecting the at least one first object and the at least one second object as the at least one target object; and when the similarity does not satisfy the similarity condition, selecting the at least one first object as the at least one target object, and omitting the at least one second object as the at least one target object; and extracting the object trajectory data of the at least one target object from the storage device and generating at least one video indexing image accordingly.

According to another embodiment, a video indexing device is provided. The video indexing device includes a storage device and a video indexing module. The video indexing module is coupled to the storage device and configured to: analyze trajectory information of a plurality of objects in video data and store a plurality of pieces of object trajectory data obtained correspondingly in the storage device; determine whether the storage device satisfies a data removal condition; when the data removal condition is satisfied, perform an object trajectory analysis on the plurality of pieces of object trajectory data to select at least one target object from the objects, wherein at the time that the data removal condition is satisfied, the storage device stores first object trajectory data of at least one first object and second object trajectory data of at least one second object, and the object trajectory analysis includes: calculating a similarity between the second object trajectory data and average trajectory data computed from the first object trajectory data; determining whether the similarity satisfies a similarity condition; when the similarity satisfies the similarity condition, selecting the at least one first object and the at least one second object as the at least one target object; and when the similarity does not satisfy the similarity condition, selecting the at least one first object as the at least one target object, and omitting the at least one second object as the at least one target object; and extract the object trajectory data of the at least one target object from the storage device and generate at least one video indexing image accordingly.

According to an alternative embodiment, a non-transitory computer readable recording medium with built-in program is provided. After the computer has loaded in and executed the program, the computer can complete the video indexing method of the present disclosure.

The above and other aspects of the invention will become better understood with regard to the following detailed description of the preferred but non-limiting embodiment (s). The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Some implementations of the present disclosure are disclosed in a number of embodiments with detailed descriptions and accompanying drawings. It should be noted that the structures and contents of the implementations are for exemplary purpose only, not for limiting the scope of protection of the present disclosure. The present disclosure does not disclose all possible embodiments. Any person ordinary skilled in the technology field, without violating the spirit and scope of the present disclosure, will be able to make necessary changes and modifications to the structures of the embodiments to meet actual needs. The above changes and modifications are also applicable to the implementations not disclosed in the present disclosure. Moreover, designations common to the embodiments are used to indicate identical or similar elements.

Figure 1:
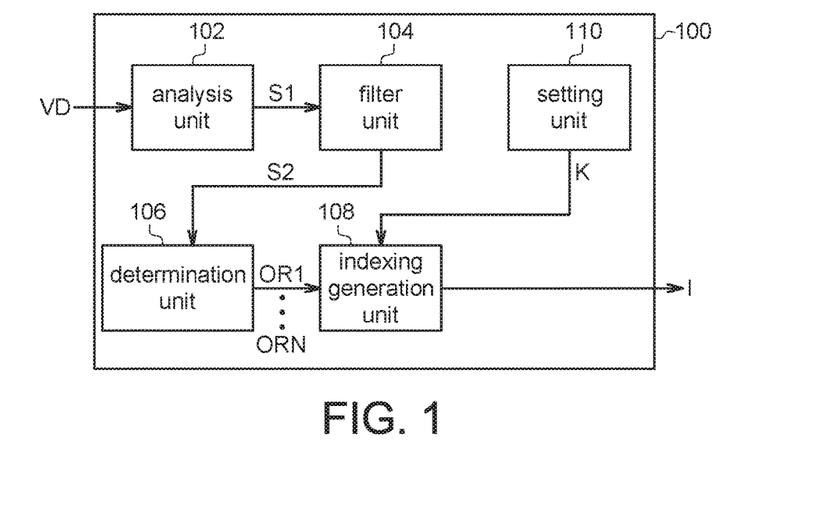
FIG. 1 is a block diagram of a video indexing device according to an embodiment of the present disclosure.
Figure 2:
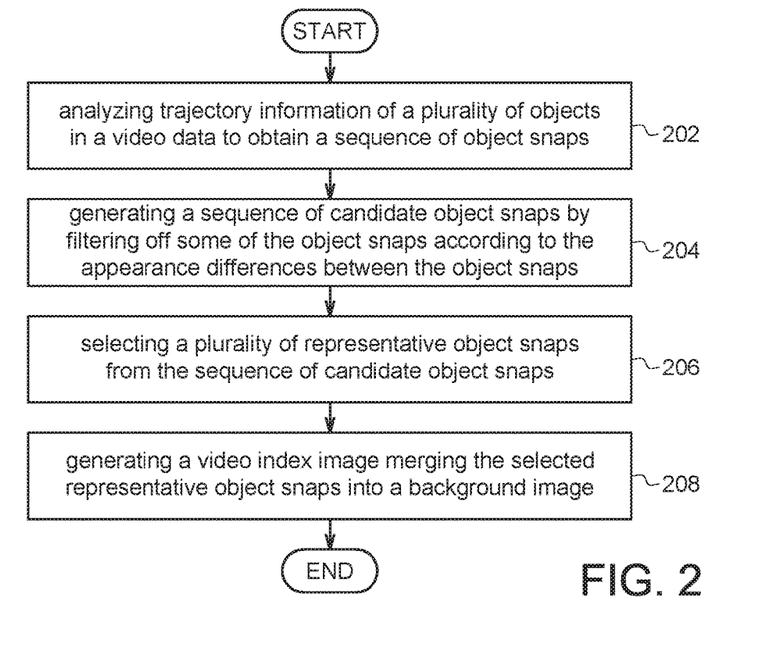
FIG. 2 is a flowchart of a video indexing method according to an embodiment of the present disclosure.

Refer to FIG. 1 and FIG. 2. FIG. 1 is a block diagram of a video indexing device 100 according to an embodiment of the present disclosure. FIG. 2 is a flowchart of a video indexing method according to an embodiment of the present disclosure. The video indexing device 100 can be realized by such as a mobile device, a PC Tablet, a personal computer, a monitoring system, or other electronic devices capable of processing video data.

The video indexing device 100 mainly includes an analysis unit 102, a filter unit 104, a determination unit 106 and an indexing generation unit 108. These units can be realized by such as an integrated circuit, a circuit board, or at least one readable programming code read from the at least one memory device by the processing unit.

In step 202, the analysis unit 102 analyzes trajectory information of a plurality of objects of the video data VD to obtain a sequence of object snaps S1, including, for example, a plurality of object snaps. The source of the video data VD is such as a video file, a video recorder of a mobile device, a network video streaming (such as YouTube), a network video recorder or a depth-of-field video recorder.

The analysis unit 102 extracts trajectory information of the objects by using the object detection and tracking algorithms. Examples of the object detection algorithm include the Gaussian mixture model (GMM) method, the temporal median filter method and the nonparametric kernel density estimation (KDE) method. Examples of the object tracking algorithm include the mean shift method, the cam shift method and the particle filter method.

For example, the analysis unit 102 creates a background image not containing any objects, and then compares the difference in each pixel between an input image and the newly created background image. If the difference is larger than a threshold, then the pixel is determined as a variant pixel, or referred as a foreground. In an embodiment, the analysis unit 102 can detect variant pixels by using a motion detection method, such as Gaussians mixture model (GMM), temporal median filter or nonparametric kernel density estimation (KDE). After the variant pixels in the frame are obtained, different objects in the foreground are marked for tracking objects.

After the object detection and tracking procedure is completed, the analysis unit 102 obtains a sequence of object trajectory in the video data VD and object snaps, and further sort the object snaps to generate the sequence of object snaps S1.

In step 204, the filter unit 104 filters off some of the object snaps according to the appearance differences between the object snaps to generate a sequence of candidate object snaps S2. For example, the filter unit 104 filters the object snaps whose degrees of similarity are larger than a similarity threshold off the sequence of object snaps S1 to generate a sequence of candidate object snaps S2. In embodiments, the degrees of similarity are calculated according to at least one of the factors including object appearance, distance, motion vector and life cycle.

In step 206, the determination unit 106 selects a plurality of representative object snaps OR1~ORN from the sequence of candidate object snaps S2. Each of the representative object snaps OR1~ORN corresponds to an object in the video data VD.

In step 208, the indexing generation unit 108 merges the representative object snaps OR1~ORN into a background image to generate one or more video indexing images I. In an embodiment, the analysis unit 102 analyzes a plurality of image snaps sampled from the video data and extracts a plurality of candidate background images. Then, the indexing generation unit 108 further selects one of the candidate background images as a background image.

The one or more video indexing images I generated by the indexing generation unit 108 can be shown on a screen for the user to view and analyze. For example, the user can click a representative object snap of the video indexing image I to browse the video content of the corresponding object.

In an embodiment, the video indexing device 100 further includes a setting unit 110 for determining an object density K, which can be used for determining the density of representative object snaps added to the video indexing image. For example, the indexing generation unit 108 sequentially merges representative object snaps OR1~ORN into a background image, and outputs a video indexing image I1 when the density of representative object snaps of the background image reaches the object density K. Meanwhile, the video indexing image I1 includes K representative object snaps (such as OR1~ORK) corresponding to K objects. Then, the representative object snaps (such as ORK+1~ORN) having not been added to the video indexing image I1 are added to another video indexing image I2, and other values of object density K can be done in the same manner. The setting unit 110, which can be realized by such as a human-machine interface, sets the value of object density K in response to an external operation.

Figure 3:
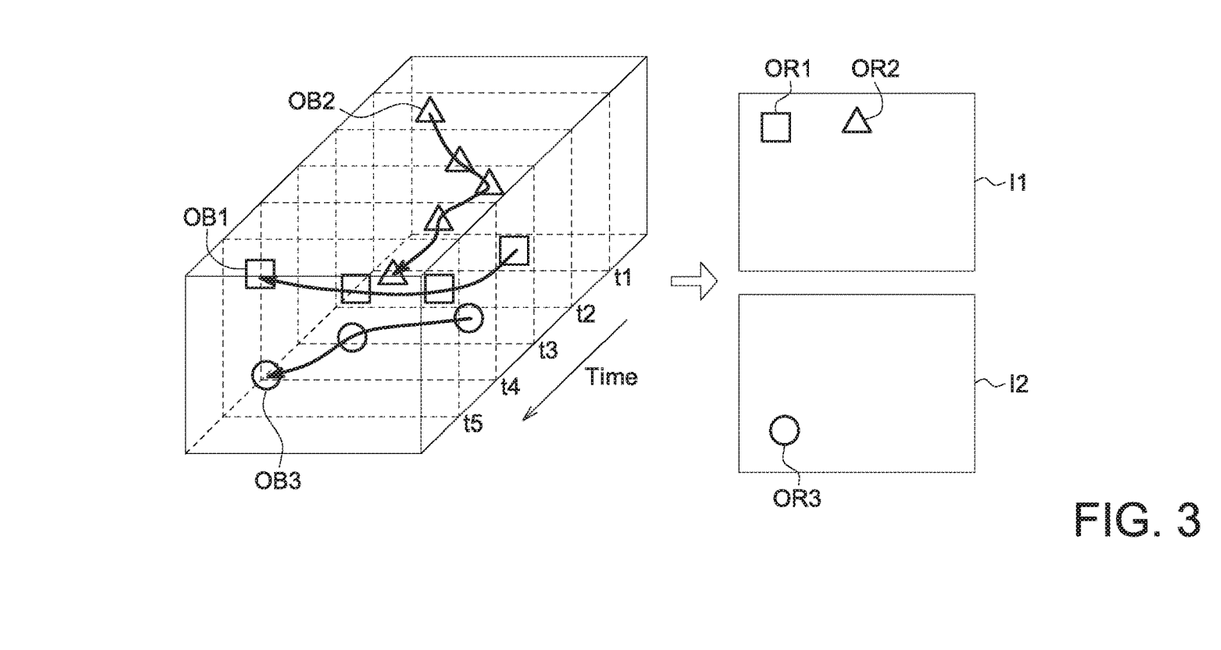
FIG. 3 is a schematic diagram of an example of creating a corresponding video indexing image from the video data.

FIG. 3 is a schematic diagram of an example of creating a corresponding video indexing image from the video data VD. In the example illustrated in FIG. 3, the foreground of the video data VD includes three objects OB1, OB2, and OB3. Respective trajectory information (as indicated in arrows) of the objects OB1~OB3 in the video data VD and the object snaps can be obtained by using an object tracking algorithm. The object snaps of the object OB1 are sampled at time points t2-t5 respectively. The object snaps of the object OB2 are sampled at time points t1-t5 respectively. The object snaps of the object OB3 are sampled at time points t3-t5 respectively.

By using the method as indicated in FIG. 2, one of the object snaps of the object OB1 is selected as the representative object snap OR1 of the object OB1, one of the object snaps of the object OB2 is selected as the representative object snap OR2 of the object OB2, and one of the object snaps of the object OB3 is selected as the representative object snap OR3 of the object OB3.

Since the representative object snaps OR1, OR2, and OR3 are sampled from the trajectory corresponding to the object OB1, OB2, and OB3, the representative object snaps appearing on the same video indexing image may correspond to the object snaps sampled at different time points. As indicated in FIG. 3, the representative object snaps OR1 and OR2 in the same video indexing image I1 correspond to the object snaps sampled at time points t5 and t1 respectively.

Based on the method of adding the object snaps to the object representative object snap and/or the value of the object density K, the object snaps sampled at the same sampling time point may appear in different video indexing images. That is, the contents of different video indexing images are not restricted by the priority by which the objects appear. Let FIG. 3 be taken for example. Suppose the object density K is set as: K=2. If the representative object snaps OR1 and OR2 have been added to the video indexing image I1, then the representative object snap OR3 will be added to another video indexing image I2 despite that both representative object snaps OR1 and OR3 correspond to the object snaps sampled at time point t5.

In an embodiment, the video data VD is divided into a plurality of sub-segments, and respective video indexing image corresponding to each sub-segment is generated. Let the uninterrupted video data VD obtained from a monitor be taken for example. The uninterrupted video data VD can be divided into a plurality of sub-segments in the unit of is minutes. Then, the method illustrated in FIG. 2 is performed on each sub-segment to generate one or more corresponding video indexing images.

Figure 4:
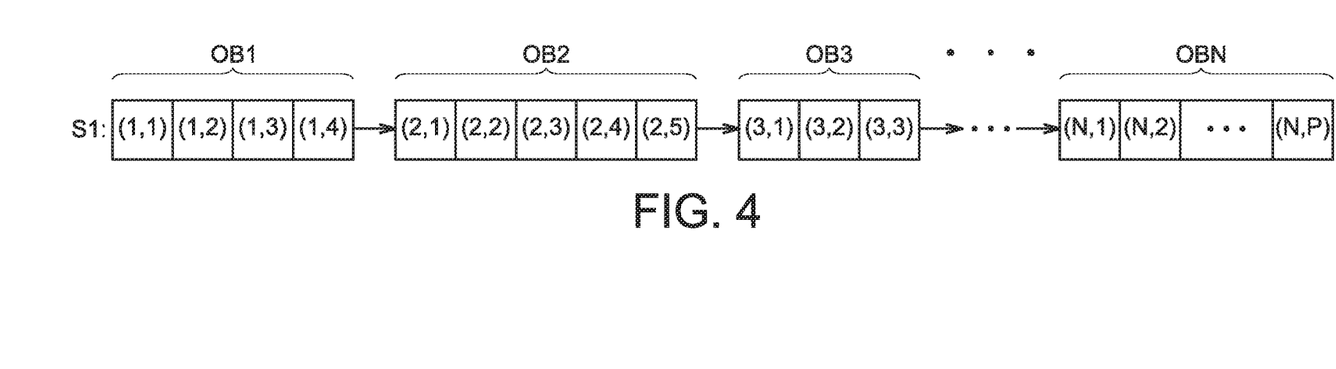
FIG. 4 is a schematic diagram of a sequence of object snaps according to an embodiment of the present disclosure.

FIG. 4 is a schematic diagram of a sequence of object snaps S1 according to an embodiment of the present disclosure. In the example illustrated in FIG. 4, the video content of the video data VD includes objects OB1~OBN. The symbol "(i, j)" represents the object snap of the i-th object (that is, OBi) sampled at the j-th time point, wherein $1 \leq i \leq N$. For example, the symbol "(1, 2)" represents the object snap of the object OB1 sampled at the second time point, the symbol "(2, 3)" represents the object snap of the object OB2 sampled at the third time point, and the rest can be obtained in the same manner.

The analysis unit 102 generates a sequence of object snaps S1 by sequentially arranging the object snaps related to the same object. In the sequence of object snaps S1 illustrated in FIG. 4, the object snaps (1, 1)~(1, 4) related to object OB1, the object snaps (2, 1)~(2, 5) related to object OB2, the object snaps (3, 1)~(3, 3) related to object OB3, and the object snaps (N, 1)~(N~P) related to the object OBN all sequentially arranged one after another. However, the sequence of object snaps S1 can be generated by using other sorting methods.

Figure 5:
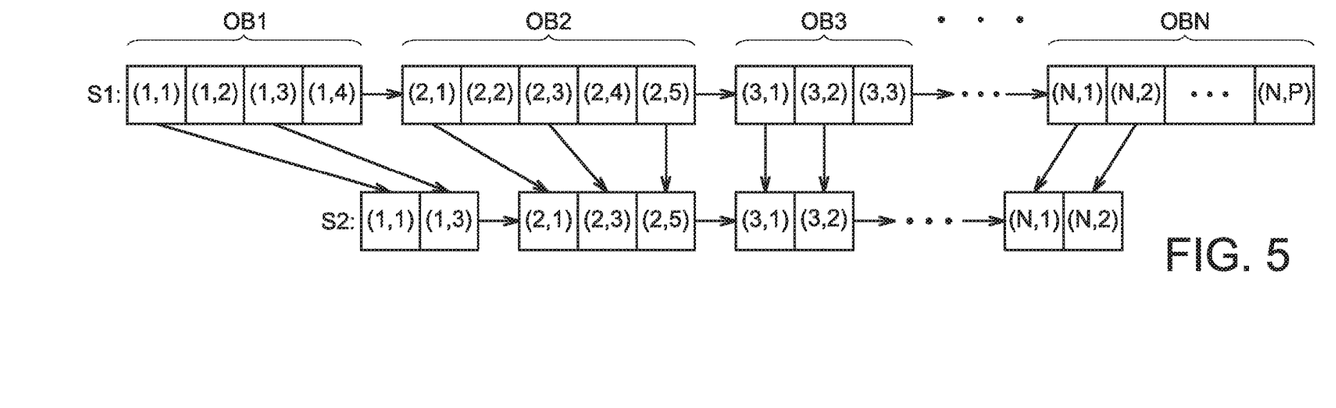
FIG. 5 is a schematic diagram of generating a sequence of candidate object snaps from the sequence of object snaps according to an embodiment of the present disclosure.

FIG. 5 is a schematic diagram of generating a sequence of candidate object snaps S2 from the sequence of object snaps S1 according to an embodiment of the present disclosure. In the example illustrated in FIG. 5, the sequence of candidate object snaps S2 is generated by filtering the object snaps (1, 2) and (1, 4) of the object OB1, the object snaps (2, 2) and (2, 4) of the object OB2, the object snaps (3, 3) of the object OB3, and the object snaps (N, 3)~(N, P) of the object OBN off the sequence of object snaps S1. The object snaps that are filtered off the sequence of object snaps S1 have high degree of similarity.

Figure 6:
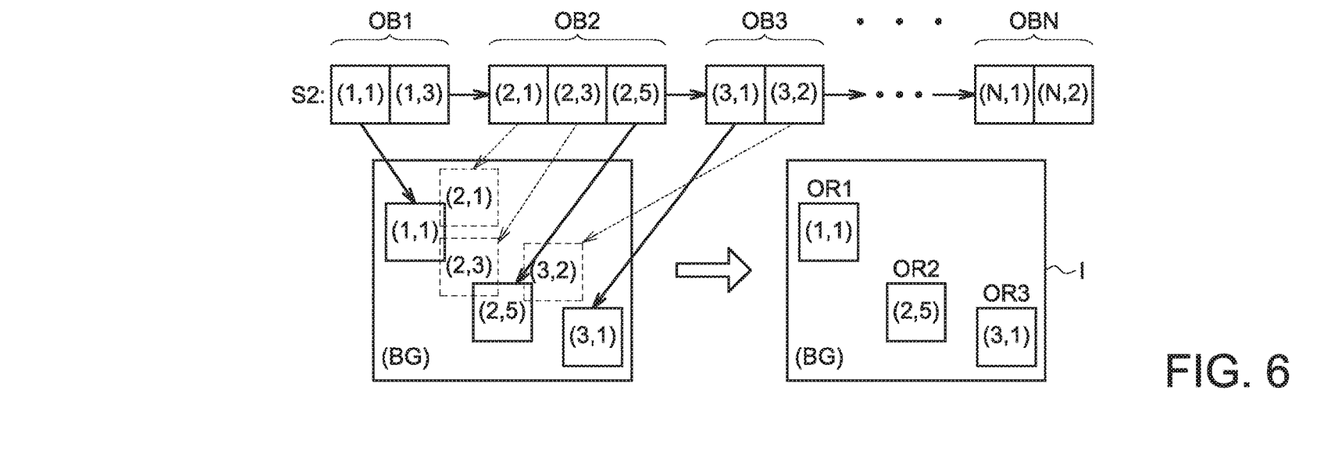
FIG. 6 is a schematic diagram of an example of generating a video indexing image by selecting a representative object snap of each object from the sequence of candidate object snaps and further merging the selected representative object snaps.

FIG. 6 is a schematic diagram of an example of generating a video indexing image by selecting a representative object snap of each object from the sequence of candidate object snaps S2 and further merging the selected representative object snaps. In the present example, the determination unit 106 selects one of the candidate object snaps (1, 1) and (1, 3) as the representative object snap OR1 of the object OB1. For example, the candidate object snap (1, 1) is selected. Next, the determination unit 106 calculates the object overlapped rate of each of the candidate object snaps (2, 1), (2, 3) and (2, 5) of the object OB2 for the representative object snap OR1, and selects one of the candidate object snaps (2, 1), (2, 3) and (2, 5) as the representative object snap OR2 of the object OB2 according to the calculation result. As indicated in FIG. 6, the candidate object snap (2, 5) has the lowest object overlapped rate for the representative object snaps OR1, and is selected as the representative object snap OR2 of the object OB2. Similarly, the determination unit 106 calculates the object overlapped rate of each of the object snaps (3, 1) and (3, 2) for the representative object snaps OR1 and OR2, which have been added to the video indexing image, and selects one of the object snaps (3, 1) and (3, 2) having a lower object overlapped rate as the representative object snap OR3 of the object OB3. For example, the object snap (3, 1) is selected, and the remaining representative object snaps can be selected in the same manner.

In an embodiment, a new candidate object snaps ci is selected and placed at position li of the video indexing image, and the target function satisfying the minimal merging space for the candidate object snaps ci and previous object snap cj is expressed as:

$$G(i) = \arg\min_{c_i} \Sigma_{i \in Q} E_a(l_i \cap l_j) \quad \text{(Formulas 1)}$$

Wherein, Ea (.) represents the cost of having collision when the candidate object snap is placed in the video indexing image; Q represents a set of all object snaps; Q' represents a set of candidate object snaps, and $Q' \subset Q$. Each time when a new object snap is added to the video indexing image, a video indexing image with compact space is generated by using a local optimum. In another embodiment, a global optimum is added to the candidate object snap.

Figure 7:
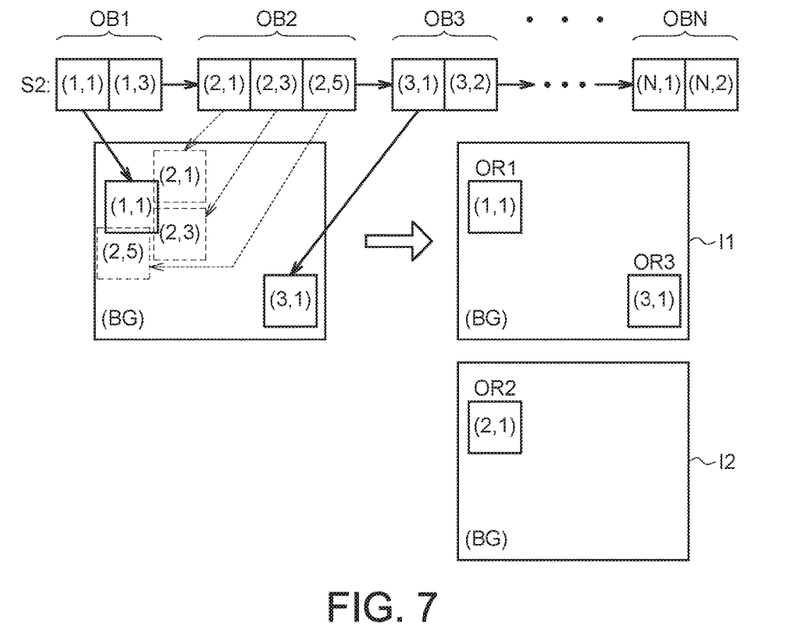
FIG. 7 is a schematic diagram of another example of generating a video indexing image by selecting a representative object snap of each object from the sequence of candidate object snaps and further merging the selected representative object snaps.

FIG. 7 is a schematic diagram of another example of generating a video indexing image by selecting a representative object snap of each object from the sequence of candidate object snaps S2 and further merging the selected representative object snaps. In the example illustrated in FIG. 7, when the object overlapped rate of each object snap of an object for the representative object snap is larger than an overlapped rate threshold, another video indexing image will be generated, and one of the object snaps of the object will be selected and shown on the another video indexing image.

Suppose the overlapped rate function of a candidate object snap ci is defined as follows:

$$AR(i) = \min_{c_i} \sum_{i \in Q'} E_a(l_i \cap l_j) / \sum_{i \in Q'} \text{Area}(c_i) \quad \text{(Formulas 2)}$$

$$I(i) = \begin{cases} c_i, & \text{if } AR(i) < \text{thr\_a} \\ 0, & \text{if } \text{otherwise} \end{cases} \quad \text{(Formulas 3)}$$

Wherein, Area (ci) represents the area of the candidate object snap ci on the video indexing image; thr_a represents an overlapped rate threshold of the area overlapped rate of an object snap. If the overlapped rate of a newly added object snap is smaller than the overlapped rate threshold thr_a, then the newly added object snap can be added to the video indexing image I (i) according to its placing position. Conversely, if the overlapped rate of the newly added object snap is not smaller than the overlapped rate threshold thr_a, then the newly added object snap will not be added to the video indexing image (i) but will wait for a better space position in the next video indexing image. In an embodiment, a global area threshold thr_b can be set for each video indexing image. If the total area occupied by the currently added candidate object snaps is larger than the global area threshold thr_b, this implies that the frame is compact enough, and a next video indexing image I (i+1) can be generated.

As indicated in FIG. 7, if the object overlapped rates of the object snaps (2, 1), (2, 3), (2, 5) for the representative object snap OR1 all are larger than the overlapped rate threshold (such as the thr_a), the object snaps will not be added to the indexinging image I1, and the representative object snap OR2 of the object OB2 (such as the object snap (2, 1)) will be added to another video indexing image I2.

Since the object overlapped rate of the object snap (3, 1) of the object OB3 for the representative object snaps OR1, which has been added to the video indexing image I1 is smaller than the overlapped rate threshold, the object snap (3, 1) is selected as the object representative object snap OR3 of the object OB3 and shown on the same video indexing image I1 together with the representative object snap OR1.

The methods of adding representative object snaps of the present invention are not limited to the above exemplifications. Any time/space algorithms considering the area and/or placing position of a representative object snap when optimizing the object overlapped rate are within the spirit of the invention.

Figure 8:
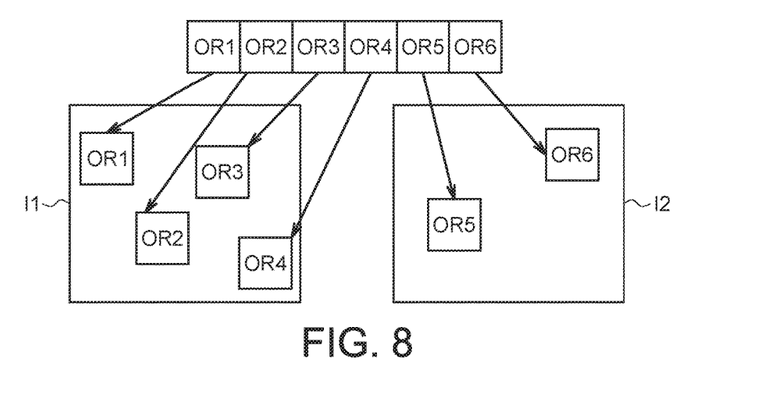
FIG. 8 is a schematic diagram of adding representative object snaps to a video indexing image according to object density according to an embodiment of the present disclosure.

FIG. 8 is a schematic diagram of adding representative object snaps to a video indexing image according to object density K according to an embodiment of the present disclosure. The object density K is for determining the density of representative object snaps in a video indexing image. In the present example, the object density K is set as: K=4. That is, at most 4 representative object snaps can be added to a video indexing image. As indicated in FIG. 8, four representative object snaps OR1~OR4 are sequentially added to the video indexing image I1, and the remaining representative object snaps OR5 and OR6 are added to the next video indexing image I2.

Figure 9:
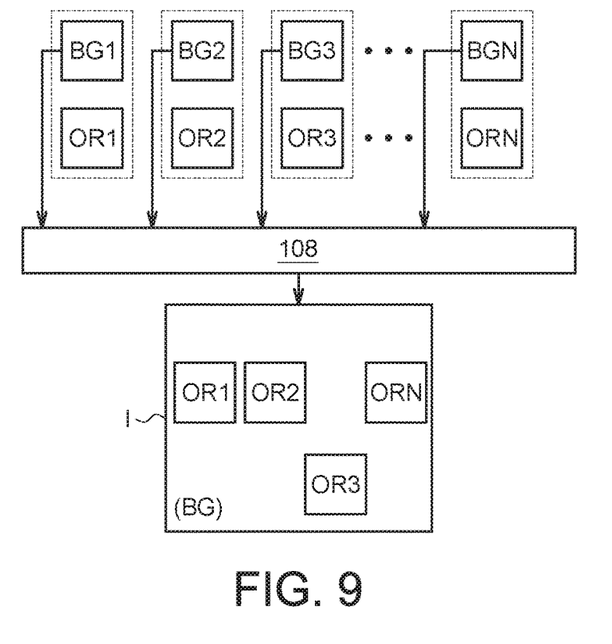
FIG. 9 is a schematic diagram of generating a background image of a video indexing image according to an embodiment of the present disclosure.

FIG. 9 is a schematic diagram of generating a background image of a video indexing image according to an embodiment of the present disclosure. In the example illustrated in FIG. 9, the indexing generation unit 108 accumulates each background image corresponding to a representative object snap, and determines the background image to be used in the video indexing image according to majority vote. Let FIG. 9 be taken for example. Suppose the candidate background images BG1 and BG2 both show a night-time scene, but the candidate background images BG3~BGN (N>4) show a daytime scene. The indexing generation unit 108, based on the voting method, will select the daytime scene corresponding to the majority of the candidate background images as the background image BG of the video indexing image I. Then, the indexing generation unit 108 generates a video indexing image I by merging the representative object snaps OR1~ORN into the background image BG by using the image blending method such as Poisson image blending, level-set approach or Laplacian pyramids.

Figure 10:
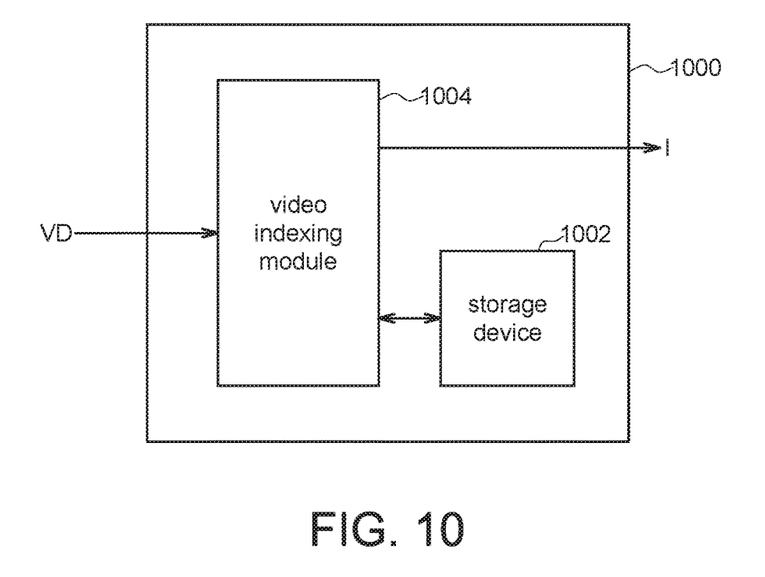
FIG. 10 is a block diagram illustrating a video indexing device according to another embodiment of the present disclosure.

FIG. 10 is a block diagram illustrating a video indexing device 1000 according to another embodiment of the present disclosure. The video indexing device 1000 mainly includes a storage device 1002 and a video indexing module 1004. The storage device 1002 can be realized by any type of storage media, such as a hard disk or a memory. The video indexing module 1004 can be a processor, or an integrated circuit or a circuit board having computing abilities. For example, the video indexing module 1004 can be realized in a computer system or a network attached storage (NAS), which may access video data VD and executes the proposed video indexing method for generating the video indexing image I. In other words, the video indexing module 1004 can perform various functionalities of each unit included in the video indexing device 100 shown in FIG. 1 and execute the proposed video indexing method in accordance with various embodiments of the present disclosure. The video indexing image I can be displayed on a screen of an electrical device (a computer or a cell phone for example), provided to the user for browsing and analyzing.

In the embodiment, the video data VD provided to the video indexing module 1004 is a real-time video stream, such as a continuous 24-hour surveillance video stream, which features continuous and non-stop properties.

The video indexing module 1004 can analyze the trajectory information of the objects presented in the video data VD and store object trajectory data obtained correspondingly in the storage device 1002. Considering that the memory space of the storage device 1002 is limited but the video data VD is uninterrupted, when the storage device 1002 satisfies a data removal condition, the video indexing module 1004 may perform an object trajectory analysis on the object trajectory data in the storage device 1002 and generate the video indexing image I according to the analysis results. The memory space in the storage device 1002 will also be released for storing the trajectory information from the subsequent video data VD. Therefore, when the video data VD is an uninterrupted real-time video stream, the video indexing module 1004 can use a limited memory space of the storage device 1002 to process the video data VD online in real time and generate the video indexing image I. Differing from the example in which the video data VD is a finite-length video clip (e.g., a complete video file), the entire object trajectory data of the video data VD can be stored, as long as the storage device 1002 provides a sufficient memory space, to enable the video indexing module 1004 to process and create the video indexing image I offline.

Figure 11:
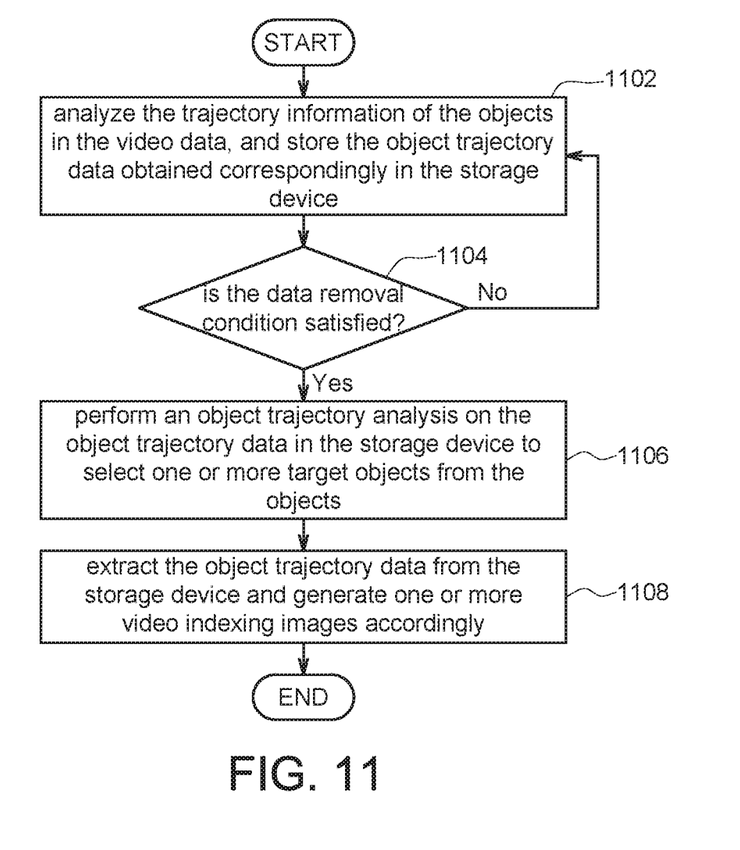
FIG. 11 is a flowchart illustrating a video indexing method in accordance with another embodiment of the present disclosure.

FIG. 11 is a flowchart illustrating a video indexing method in accordance with another embodiment of the present disclosure. In step 1102, the video indexing module analyses the trajectory information of the objects in the video data VD and stores the object trajectory data obtained correspondingly in the storage device 1002. For example, based on the functions of the analysis unit 102, the video indexing module 1004 may detect and track the objects in the video data VD to obtain the trajectories associated with each object and the object snaps captured at various time points, and then store them in the storage device 1002.

In step 1104, the video indexing module 1004 determines whether the storage device 1002 satisfies the data removal condition. The data removal condition can be used for triggering the video indexing module 1004 to establish the video indexing image I based on the object trajectory data stored in the storage device 1002. In an embodiment, the data removal condition may refer to insufficient memory space in the storage device 1002 (e.g., memory full). In another embodiment, the data removal condition may refer to the expiration of a periodic cycle (e.g., every 5 min).

When the storage device 1002 satisfies the data removal condition, in step 1106, the video indexing module 1004 performs an object trajectory analysis on the object trajectory data in the storage device 1002 to select one or more target objects from the objects.

On the contrary, if the storage device 1002 does not satisfy the data removal condition, the flow goes back to step 1102, in which the video indexing module 1004 continuously stores the object trajectory data into the storage device 1002.

The main purpose for performing the object trajectory analysis is to use the commonality between the trajectories of the objects in the video data VD for comparing the similarity between the objects for which the object tracking procedure has not yet completed and the average trajectory, so that one or more target objects that fits a similarity condition (e.g., the similarity is greater than or equal to a threshold value) can be identified. The trajectories of the target objects will be considered predictable. Therefore, given that the tracking procedure have not yet completed for a part of the target objects when the data removal condition is satisfied, the video indexing module 1004 may still use this part of target objects' trajectories to generate and output the video indexing image I, so that a subsequent tracking procedure for this part of target objects can be neglected. This not only reduces the operation time of the video indexing module 1004 required in executing the object tracking procedure but also saves the memory space of the storage device 1002, enabling the video indexing module 1004 to rapidly and instantly generate the video indexing image I from the streaming video data VD under limited resource conditions to provide the user a quick browse.

In step 1108, the video indexing module 1004 extracts the object trajectory data from the storage device 1002 and generates one or more video indexing images I accordingly.

The object trajectory data of the target objects includes the object snaps of each target object. These object snaps will be arranged as a sequence of object snaps S1 according to the association with the corresponding target objects. After obtaining the sequence of object snaps S1 of the target objects, the video indexing module 1004 may perform, for example, the video indexing method shown in FIG. 2 to generate one or more video indexing images I. The selection and arrangement for the representative object snaps are described above in reference with FIGS. 5-9, and the related descriptions are omitted here. After extracting the object trajectory data of the target objects, the video indexing module 1004 then clears the object trajectory data in the storage device 1002 to make the storage device 1002 as available to be written in the newest object trajectory data and generate one or more new video indexing images I when next time the data removal condition is satisfied.

Figure 12:
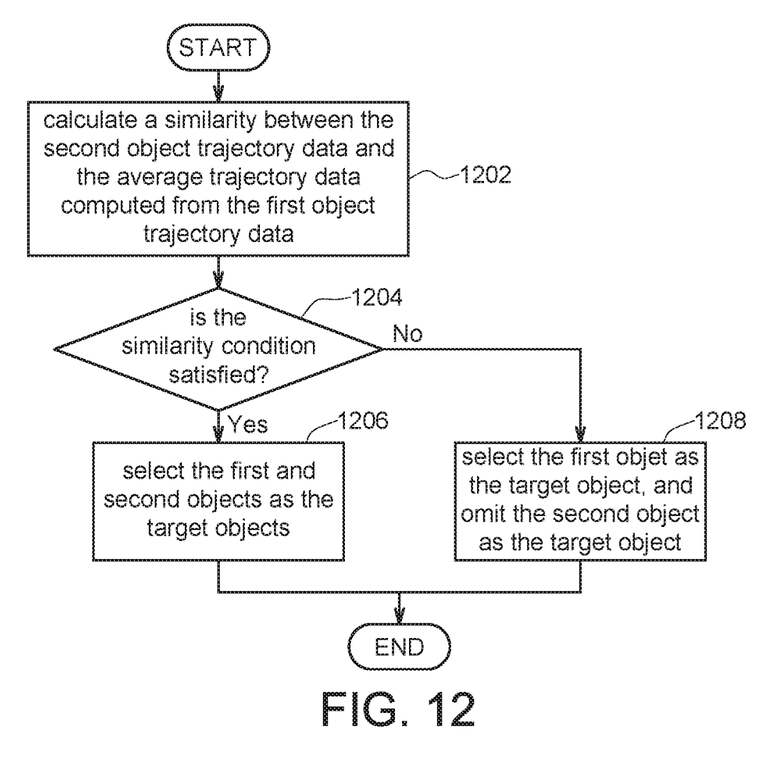
FIG. 12 is a flowchart illustrating an example of the object trajectory analysis.

FIG. 12 is a flowchart illustrating an example of the object trajectory analysis.

When executing the object trajectory analysis, the video indexing module 1004 may divide the objects corresponding to the object trajectory data in the storage device 1002 into two groups: objects for which the tracking procedure has completed (i.e., first objects) and objects for which the tracking procedure has not yet completed (i.e., second objects). The object trajectory analysis may be an algorithm executed by the analysis unit 102 for extracting the object's trajectory information as described above.

Generally, when the video indexing module 1004 has completed the tracking procedure for an object, it means that the video indexing module 1004 will be able to detect and obtain the complete trajectory information of the object from entering to leaving the scene. Contrarily, when the video indexing module 1004 has not completed the tracking procedure for an object, it means that the object detected by video indexing module 1004 remains moving in the scene, while its moving trajectory is still in progress. Therefore, in an embodiment, the object trajectory data of the first object (i.e., the first object trajectory data) may include the object snaps of the first object entering and leaving a scene; and the object trajectory data of the second object (i.e., the second object trajectory data) may include the object snap of the second object captured when the data removal condition is satisfied.

When the data removal condition is satisfied, if the storage device 1002 includes the first object trajectory data of at least one first object and the second object trajectory data of at least one second objet, then in step 1202, the video indexing module 1004 calculates a similarity between the second object trajectory data and the average trajectory data computed from the first object trajectory data.

For example, the longest common subsequence (LCS) algorithm can be used to calculate the similarity between the second object trajectory data and the average trajectory data:

$$S(T_V, T_{avg}) = LCS_\varepsilon(T_V, T_{avg}) / \min(M, N)$$

Wherein, $T_v$ refers to the second object trajectory data; $T_{avg}$ refers to the average trajectory data; M and N refer to the numbers of track points in the second object trajectory data and the average trajectory data, respectively; and $LCS_\varepsilon(T_V, T_{avg})$ represents the longest common trajectory between $T_v$ and $T_{avg}$.

In an embodiment, Euclidean distance can be adopted to calculate the length between the $LCS_\varepsilon(T_V, T_{avg})$ and each track point of $T_{avg}$. When the number of points in the two trajectories that satisfy the distance $\varepsilon$ exceeds a default threshold, the second object for which the tracking procedure has not yet completed can be regarded as a normal moving object. The subsequent tracking steps can thus be omitted. In such cases, the second object, along with the first object, can be directly considered as the target objects. Otherwise, the object trajectory data of the second object is written in the storage device 1002, and the algorithm will wait for the completion of the object tracking procedure until the memory space of the storage device 1002 is filled again and then extract the data for analysis.

In step 1204, the video indexing module 1004 determines whether the similarity satisfies a similarity condition. For example, when the similarity exceeds a threshold value, the similarity condition is satisfied.

In step 1206, when the similarity satisfies the similarity condition (i.e., the second object trajectory data is similar to the average trajectory data), the video indexing module 1004 selects the first objects and the second objects as the target objects.

As described above, when an object is selected as the target object, the video indexing module 1004 will extract the target object's object trajectory data when the data removal condition is satisfied, and generates the video indexing image I according to the extracted object trajectory data. For example, if both the first and second objects are selected as the target objects, the video indexing module 1004 may, based on the video indexing method shown in FIG. 2, select the first object's representative object snap (i.e., the first representative object snap) from the first object trajectory data, select the second object's representative object snap (i.e., the second representative object snap) from the second object trajectory data, and add the first and second representative object snaps into one or more video indexing images I.

In step 1208, when the similarity does not satisfy the similarity condition, the video indexing module 1004 may select the first objet as the target object, and omit the second object as the target object.

Because the second object is not selected as the target object, the video indexing module 1004 will not generate the second representative object snap for the second object according to the second object trajectory data and will not add it in the video indexing image I during the video indexing image generation process.

In such cases, after clearing the object trajectory data in the storage device 1002, the video indexing module 1004 may continue to execute the remaining incomplete object tracking procedure for the second object and store other second object trajectory data of the second object in the storage device 1002. The video indexing module 1004 may generate the second representative object snap for the second object according to the other second object trajectory data, and display the second representative object snap on another video indexing image I generated in this stage.

Figure 13A:
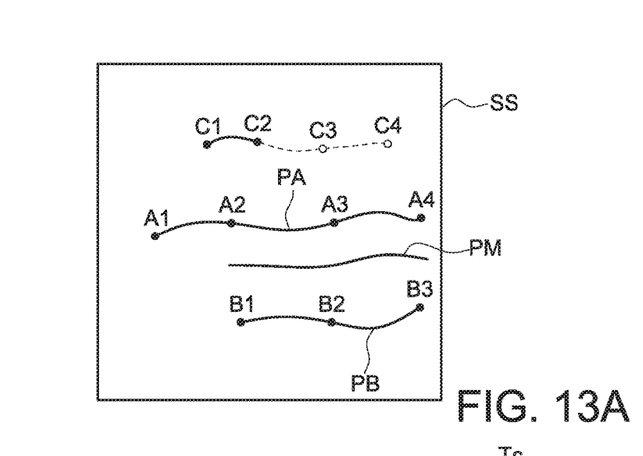
FIG. 13A is a schematic diagram illustrating object trajectories of multiple objects in one scene.
Figure 13B:
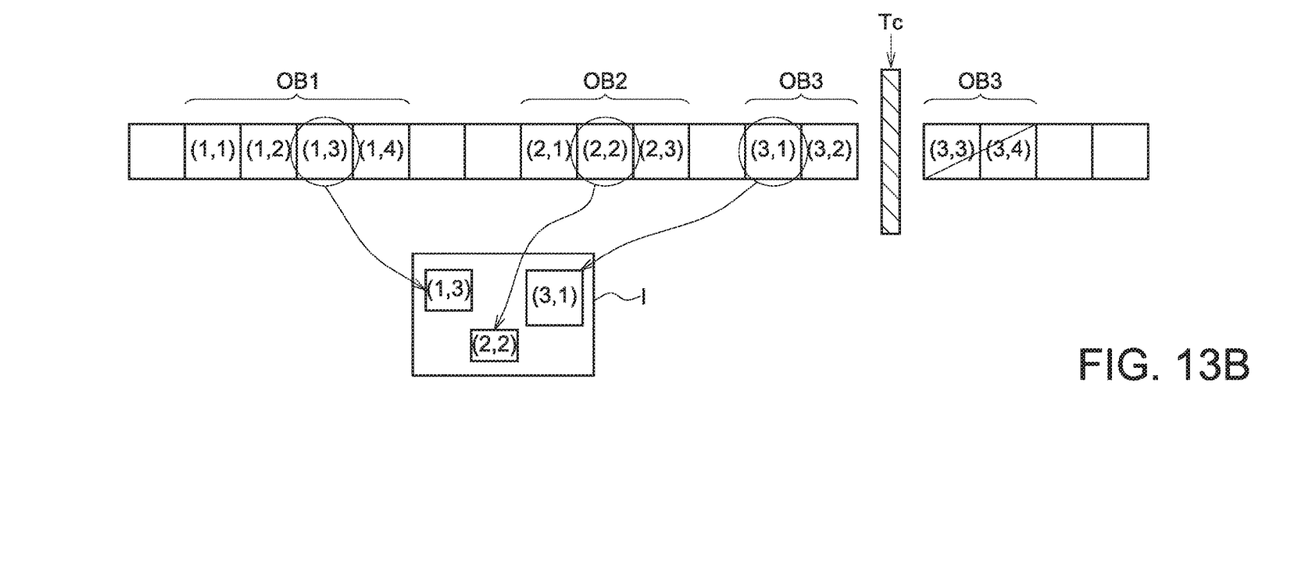
FIG. 13B illustrates object trajectory data of the corresponding objects.

Please refer to FIGS. 13A and 13B. FIG. 13A is a schematic diagram illustrating object trajectories of multiple objects in one scene. FIG. 13B illustrates object trajectory data of the corresponding objects.

In FIG. 13A, the object OB1 sequentially appears at positions A1 to A4 in the scene SS with time delay. The connection from the position A1 to A4 is equivalent to the object OB1's object trajectory. Likewise, the object OB2 sequentially appears at positions B1 to B3 in the scene SS with time delay. The connection from the position B1 to B3 is equivalent to the object OB2's object trajectory; and the object OB3 sequentially appears at positions C1 to C4 in the scene SS with time delay. The connection from the position C1 to C4 is equivalent to the object OB3's object trajectory.

If the video indexing module 1004 has completed the object tracking procedures for the objects OB1 and OB2 and obtained the complete object trajectories PA and PB but has not done so for the object OB3 (e.g., the object OB3 only moved from the position C1 to C2) when the data removal condition is satisfied, the video indexing module 1004 will average the object trajectory data (i.e., the first object trajectory data) for the objects OB1, OB2 (i.e., the first objects) for which the tracking procedure has completed to obtain the average trajectory data (e.g., the track PM). For example, the video indexing module 1004 will average the position coordinates of the objects OB1 and OB2 at the corresponding time points to obtain the position coordinates of the average trajectory data at the specific time points.

Then, the video indexing module 1004 calculates the similarity between the object trajectory data (i.e., the second object trajectory data) for the object OB3 moving from the position C1 to C2 and the average trajectory data, and determines whether the second object trajectory data is predictable or not.

As shown in FIG. 13B, the object snaps for the object OB1 at positions A1 to A4 are (1,1) to (1,4), respectively; the object snaps for the object OB2 at positions B1 to B3 are (2,1) to (2,3), respectively; and the object snaps for the object OB3 at positions C1 to C4 are (3,1) to (3,4), respectively.

At time point Tc, the data removal condition is satisfied, the storage device 1002 stores the object trajectory data of the object OB1 (i.e., the object snaps (1,1) to (1,4)), the object trajectory data of the object OB2 (i.e., the object snaps (2,1) to (2,3)) and the object trajectory data of the object OB3 (i.e., the object snaps (3,1) to (3,2)). Because the video indexing module 1004 has already completed the object tracking procedures for the objects OB1 and OB2, the video indexing module 1004 may calculate and obtain the average trajectory data based on the object trajectory data of the objects OB1 and OB2 (i.e., the first object trajectory data). Subsequently, the video module 1004 may calculate the similarity between the object trajectory data of the object OB3 for which the object tracking procedure has not yet completed (i.e., the second object trajectory data) and the average trajectory data, to determine whether the similarity condition is satisfied. This example assumes that the similarity between the object OB3's object trajectory data and the average trajectory data exceeds a threshold value. Therefore, the object OB3, together with the objects OB1 and OB2 for which the tracking procedure has completed, are considered as the target objects. The video indexing module 1004 may individually obtain the object snaps (1,3), (2,2), and (3,1) from the object trajectory data of the objects OB1, OB2, and OB3 respectively as the representative object snaps to be displayed in video indexing image I.

After the time point Tc, the video indexing module 1004 omits the object tracking procedure for the object OB3, thereby saving the computing resources and memory spaces.

Figure 14A:
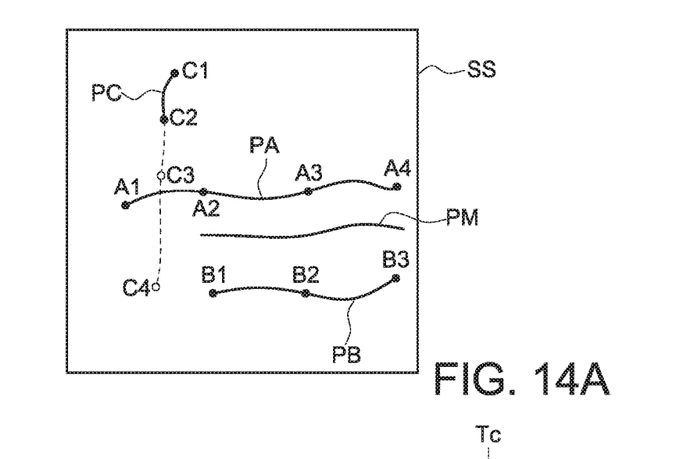
FIG. 14A is another schematic diagram illustrating object trajectories of multiple objects in one scene.
Figure 14B:
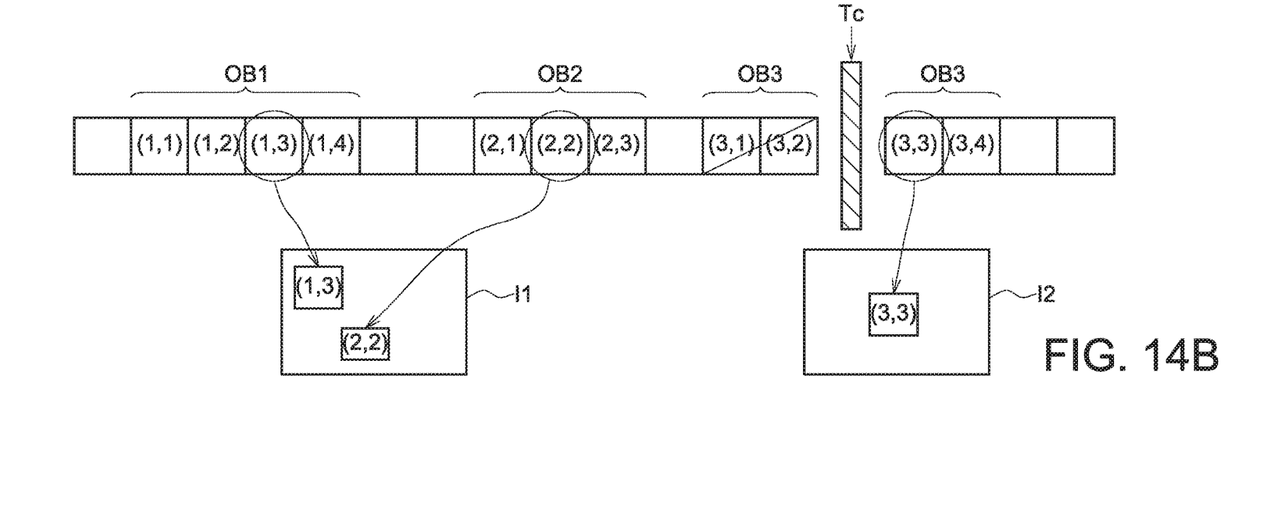
FIG. 14B illustrates object trajectory data of the corresponding objects.

FIG. 14A is another schematic diagram illustrating object trajectories of multiple objects in one scene. FIG. 14B illustrates object trajectory data of the corresponding objects.

The main difference between the embodiments of FIGS. 14A-14B and FIGS. 13A-13B is that the similarity between the object OB3 for which the object tracking procedure has not yet completed and the average trajectory data does not satisfy the similarity condition (e.g., less than a threshold value). In such cases, the video indexing module 1004 discards the object OB3's object snaps (3,1) and (3,2) in the storage device 1002 that are stored before the time point Tc, and displays only the representative object snaps (e.g., the object snaps (1,3) and (2,2)) of the objects OB1 and OB2 (for which the object tracking procedure has completed) in the video indexing image I.

After the time point Tc, the video indexing module 1004 may continue the object tracking procedure for the object OB3 and select from the corresponding object trajectory data generated (e.g., object snaps (3,3) and (3,4)) as the representative object snap for the object OB3 (e.g., the object snap (3,3)) and display the representative object snap in the video indexing image I2 generated in the subsequent stage (i.e., each time the data removal condition is satisfied is considered a new stage).

The present disclosure further provides a non-transitory computer readable recording medium with built-in program capable of completing the video indexing methods disclosed above after the computer loads in and executes the program.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A video indexing method, comprising:
    analyzing trajectory information of a plurality of objects in video data and storing a plurality of pieces of object trajectory data obtained correspondingly in a storage device;
    determining whether the storage device satisfies a data removal condition;
    when the data removal condition is satisfied, performing an object trajectory analysis on the plurality of pieces of object trajectory data to select at least one target object from the objects, wherein at the time that the data removal condition is satisfied, the storage device stores first object trajectory data of at least one first object and second object trajectory data of at least one second object, and the object trajectory analysis comprises:
    calculating a similarity between the second object trajectory data and average trajectory data computed from the first object trajectory data;
    determining whether the similarity satisfies a similarity condition, the similarity condition representing that the similarity is greater than or equal to a threshold value, wherein the similarity is calculated by a longest common subsequence (LCS) algorithm;
    when the similarity satisfies the similarity condition, selecting the at least one first object and the at least one second object as the at least one target object; and
    when the similarity does not satisfy the similarity condition, selecting the at least one first object as the at least one target object, and removing the second object trajectory data of the at least one second object having been stored in the storage device, so as to omit the at least one second object as the at least one target object; and
    extracting the object trajectory data of the at least one target object from the storage device and generating at least one video indexing image accordingly.

2. The video indexing method according to claim 1, further comprising:
    when the similarity satisfies the similarity condition:
        obtaining a first representative object snap from the first object trajectory data;
        obtaining a second representative object snap from the second object trajectory data; and
        displaying the first representative object snap and the second representative object snap in the video indexing image.

3. The video indexing method according to claim 1, further comprising:
    when the similarity does not satisfy the similarity condition:
        obtaining a first representative object snap from the first object trajectory data; and
        displaying the first representative object snap in the video indexing image, wherein the video indexing image does not comprise a second representative object snap of the at least one second object.

4. The video indexing method according to claim 1, wherein the data removal condition refers to insufficient memory space in the storage device.

5. The video indexing method according to claim 1, wherein the data removal condition refers to an expiration of a periodic cycle.

6. The video indexing method according to claim 1, further comprising:
    after extracting the object trajectory data of the at least one target object, clearing the plurality of pieces of object trajectory data in the storage device.

7. The video indexing method according to claim 6, further comprising:
    after clearing the plurality of pieces of object trajectory data in the storage device, storing other second object trajectory data corresponding to the at least one second object in the storage device; and
    obtaining a second representative object snap from the other second object trajectory data, and displaying the second representative object snap in another video indexing image.

8. The video indexing method according to claim 1, further comprising:
    executing an object tracking procedure for the objects in the video data to generate the plurality of pieces of object trajectory data;
    wherein the at least one first object is one or more of the objects for which the object tracking procedure has completed, and the at least one second object is one or more of the objects for which the object tracking procedure has not yet completed.

9. The video indexing method according to claim 1, wherein the similarity condition represents as $S(T_V, T_{avg}) = LCS_\varepsilon(T_V, T_{avg})/\min(M,N)$, wherein $T_v$ refers to the second object trajectory data; $T_{avg}$ refers to an average trajectory data computed from the first object trajectory data; M and N refer to the numbers of track points in the second object trajectory data and the average trajectory data, respectively; and $LCS_\varepsilon(T_V, T_{avg})$ represents the longest common trajectory between $T_v$ and $T_{avg}$.

10. The video indexing method according to claim 1, wherein the video data is a video stream.

11. A non-transitory computer readable recording medium with built-in program, wherein the non-transitory computer readable recording medium with built-in program is capable of completing the method according to claim 1 after a computer loads in and executes the program.

12. A video indexing device, comprising:
    a storage device;
    a video indexing module coupled to the storage device, including an integrated circuit or at least one readable programming code read from the storage device, configured to perform following steps:
    analyze trajectory information of a plurality of objects in video data and store a plurality of pieces of object trajectory data obtained correspondingly in the storage device;
    determine whether the storage device satisfies a data removal condition;

when the data removal condition is satisfied, perform an object trajectory analysis on the plurality of pieces of object trajectory data to select at least one target object from the objects, wherein at the time that the data removal condition is satisfied, the storage device stores first object trajectory data of at least one first object and second object trajectory data of at least one second object, and the object trajectory analysis comprises:

calculating a similarity between the second object trajectory data and average trajectory data computed from the first object trajectory data;

determining whether the similarity satisfies a similarity condition, the similarity condition representing that the similarity is greater than or equal to a threshold value, wherein the similarity is calculated by a longest common subsequence (LCS) algorithm;

when the similarity satisfies the similarity condition, selecting the at least one first object and the at least one second object as the at least one target object; and when the similarity does not satisfy the similarity condition, selecting the at least one first object as the at least one target object, and removing the second object trajectory data of the at least one second object having been stored in the storage device, so as to omit the at least one second object as the at least one target object; and extract the object trajectory data of the at least one target object from the storage device and generate at least one video indexing image accordingly.

13. The video indexing device according to claim 12, wherein the video indexing module is further configured to:
when the similarity satisfies the similarity condition:
obtain a first representative object snap from the first object trajectory data;
obtain a second representative object snap from the second object trajectory data; and
display the first representative object snap and the second representative object snap in the video indexing image.

14. The video indexing device according to claim 12, wherein the video indexing module is further configured to:
when the similarity does not satisfy the similarity condition:
obtain a first representative object snap from the first object trajectory data; and
display the first representative object snap in the video indexing image, wherein the video indexing image does not comprise a second representative object snap of the at least one second object.

15. The video indexing device according to claim 12, wherein the data removal condition refers to insufficient memory space in the storage device.

16. The video indexing device according to claim 12, wherein the data removal condition refers to an expiration of a periodic cycle.

17. The video indexing device according to claim 12, wherein the video indexing module is further configured to:
after extracting the object trajectory data of the at least one target object, clear the plurality of pieces of object trajectory data in the storage device.

18. The video indexing device according to claim 17, wherein the video indexing module is further configured to:
after clearing the plurality of pieces of object trajectory data in the storage device, store other second object trajectory data corresponding to the at least one second object in the storage device; and
obtain a second representative object snap from the other second object trajectory data, and display the second representative object snap in another video indexing image.

19. The video indexing device according to claim 12, wherein the video indexing module is further configured to:
execute an object tracking procedure for the objects in the video data to generate the plurality of pieces of object trajectory data;
wherein the at least one first object is one or more of the objects for which the object tracking procedure has completed, and the at least one second object is one or more of the objects for which the object tracking procedure has not yet completed.

20. The video indexing device according to claim 12, wherein the similarity condition represents as $S(T_\nu, T_{avg}) = LCS_\varepsilon(T_\nu, T_{avg})/\min(M,N)$, wherein $T_\nu$ refers to the second object trajectory data; $T_{avg}$ refers to an average trajectory data computed from the first object trajectory data; M and N refer to the numbers of track points in the second object trajectory data and the average trajectory data, respectively; and $LCS_\varepsilon(T_\nu, T_{avg})$ represents the longest common trajectory between $T_\nu$ and $T_{avg}$.

21. The video indexing device according to claim 12, wherein the video data is a video stream.

* * * * *